(12) United States Patent
Forster et al.

(10) Patent No.: US 7,057,562 B2
(45) Date of Patent: Jun. 6, 2006

(54) RFID DEVICE WITH PATTERNED ANTENNA, AND METHOD OF MAKING

(75) Inventors: Ian J. Forster, Chelmsford (GB); Barry J. Roberts, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 129 days.

(21) Appl. No.: 10/798,957

(22) Filed: Mar. 11, 2004

(65) Prior Publication Data
US 2005/0200539 A1 Sep. 15, 2005

(51) Int. Cl.
H01Q 1/38 (2006.01)
(52) U.S. Cl. ................... 343/700 MS; 29/600
(58) Field of Classification Search ......... 343/700 MS, 343/895, 795; 340/572.7; 235/492; 29/600
See application file for complete search history.

(56) References Cited

U.S. PATENT DOCUMENTS

| | | | |
|---|---|---|---|
| 5,430,441 A | 7/1995 | Bickley et al. | 340/825.4 |
| 5,528,222 A | 6/1996 | Moskowitz et al. | 340/572 |
| 6,107,920 A | 8/2000 | Eberhardt et al. | 340/572.7 |
| 6,206,292 B1 | 3/2001 | Robertz et al. | 235/488 |
| 6,259,408 B1 | 7/2001 | Brady et al. | 343/700 MS |
| 6,262,292 B1 | 7/2001 | Yasuda et al. | 558/415 |
| 6,501,435 B1 | 12/2002 | King et al. | 343/795 |
| 6,606,247 B1 | 8/2003 | Credelle et al. | 361/737 |
| 6,830,193 B1 * | 12/2004 | Tanaka | 235/492 |
| 2001/0050638 A1 | 12/2001 | Ishitobi et al. | |
| 2004/0001029 A1 | 1/2004 | Parsche et al. | 343/866 |
| 2004/0032377 A1 | 2/2004 | Forster et al. | 343/895 |
| 2004/0075616 A1 * | 4/2004 | Endo et al. | 343/895 |

FOREIGN PATENT DOCUMENTS

| | | |
|---|---|---|
| EP | 1 039 543 | 9/2000 |
| EP | 1 094 544 | 4/2001 |
| WO | WO 01/24314 | 4/2001 |

OTHER PUBLICATIONS

U.S. Appl. No. 60/517,148, filed Nov. 4, 2003.
Shafai, L., et al.; Bandwidth and Polarization Characteristics of Perforated Patch Antennas, 10th International Conference on Antennas and propagation, Apr. 14-17, 1997 Conference Publication No. 436, IEE 1997.

* cited by examiner

*Primary Examiner*—Hoang V. Nguyen
(74) *Attorney, Agent, or Firm*—Renner, Otto, Boisselle & Sklar, LLP (57) ABSTRACT

A radio frequency identification device (RFID) antenna structure includes electrically-conductive material. The antenna structure includes low effective resistance-material areas and high effective resistance areas in regions where there would be little current flow if there were more low effective resistance material. The high effective resistance areas may be spaces within the antenna structure in which there is substantially no electrically conductive material. Alternatively, high effective resistance material in the high effective resistance areas may have a non-zero lower electrical conductivity than the low effective resistance material in the low effective resistance-material areas. Conductive material for the antenna structure may include conductive ink. By reducing or eliminating the amount of conductive material in the high effective resistance areas, it will be appreciated that reduced-cost devices may be obtained.

53 Claims, 3 Drawing Sheets

RFID DEVICE WITH PATTERNED ANTENNA, AND METHOD OF MAKING

BACKGROUND OF THE INVENTION

1. Field of the Invention

This invention relates to the field of Radio Frequency Identification (RFID) tags and labels, and in particular to antenna structures for such tags and labels, and methods of reducing costs of antenna structures.

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security-locks in cars, for access control to buildings, and for tracking inventory and parcels. Some examples of RFID tags and labels appear in U.S. Pat. Nos. 6,107,920, 6,206,292, and 6,262,292, all of which are hereby incorporated by reference in their entireties.

As noted above, RFID devices are generally categorized as labels or tags. RFID labels are RFID devices that have a surface attached directly to an object, adhesively or otherwise. RFID tags, in contrast, are secured to objects by other means, for example by use of a plastic fastener, string or other fastening means.

The RFID devices generally utilize an antenna structure that is operatively coupled to electrical or electronic components, in the form of a chip or a strap (such as is described in U.S. Pat. No. 6,606,247), to communicate with a receiver or transceiver device such as a detector or reader. The antenna structure utilizes conductive material arranged on a dielectric substrate in a suitable array. The antenna structure is coupled to the chip or strap to allow communication between the RFID device and the reader and the detector. A wide variety of antenna sizes, shapes, and configurations may be utilized to achieve various communication characteristics, depending on many factors.

The conductive material of the antenna structure may be attached on the dielectric substrate by any of a variety of suitable methods. One such method involves printing of a conductive ink to form the antenna structure. Such conductive inks may include any of a variety of suitable electrically conductive materials, including conductive metal particles, carbon particles, or conductive polymer particles.

The cost of RFID devices has been a significant barrier to more widespread use of such devices. One component of the cost is the cost of materials for the antenna structure, such as the cost for the conductive ink that may be used to print the antenna structure. Accordingly it would be advantageous to achieve cost reductions in RFID devices, such as by reducing the expense of materials utilized, or by otherwise reducing fabrication costs.

SUMMARY OF THE INVENTION

According to one aspect of the present invention, an antenna structure for a radio frequency identification (RFID) device includes low effective resistance and high effective resistance portions or areas.

According to another aspect of the invention, an antenna structure for an RFID device includes low effective resistance and high effective resistance portions or areas, wherein the low effective resistance portion fully surrounds the high effective resistance portion.

According to yet another aspect of the invention, an antenna structure for an RFID device includes low effective resistance and high effective resistance portions, wherein the low effective resistance portion is thicker than the high effective resistance portion.

According to still another aspect of the invention, an antenna structure for an RFID device includes low effective resistance and high effective resistance portions, wherein the low effective resistance portion has a contoured surface.

According to a further aspect of the invention, an antenna structure for an RFID device includes low effective resistance and high effective resistance portions, wherein the low effective resistance portion has a non-uniform surface.

According to a still further aspect of the invention, an antenna structure for an RFID device includes low effective resistance and high effective resistance portions, wherein the high effective resistance portion is substantially free of conductive material.

According to another aspect of the invention, an antenna structure for an RFID device includes low effective resistance and high effective resistance portions, wherein the low effective resistance portion includes a sandwich structure, with layers of conductive material separated by an insulator layer.

According to yet another aspect of the invention, an antenna structure for a radio frequency identification (RFID) device includes low effective resistance and high effective resistance portions, wherein the low effective resistance portion includes multiple separate conductors. According to a specific embodiment, the multiple conductors include discrete conductors on depressions or recesses in a surface of an underlying substrate. The conductors may have multiple layers, with the layers separated by a layer of insulator material.

The high effective resistance portions may be a solid material with effectively zero electrical conductivity. The high effective resistance portions also may be spaces within an antenna structure wherein solid conductive material is omitted or removed from a nominal antenna shape. The nominal shape may be analyzed by computer modeling, to decide upon desirable portions of the conductive material to remove or omit.

According to still another aspect of the invention, a method of configuring an antenna structure includes using numerical simulation to determine areas and/or volumes that are candidates for high effective resistance portions of the structure.

According to a further aspect of the invention, a method of configuring a radio frequency identification (RFID) device antenna structure, the method including the steps of identifying a low-current-flow portion of an antenna layout proposed for the antenna structure; and placing a high effective resistance region in the low-current-flow portion, and low effective resistance regions in other portions of the antenna layout.

According to a still further aspect of the invention, a radio frequency identification (RFID) device includes a substrate; an antenna structure on the substrate; and an RFID strap operatively coupled to the antenna structure. The antenna structure includes: a low effective resistance region; and a high effective resistance region having an electrical conductivity less than that of the low effective resistance. The low effective resistance region substantially fully surrounds the high effective resistance region.

According to another aspect of the invention, a radio frequency identification (RFID) device includes: a substrate; an antenna structure on the substrate; and an RFID strap operatively coupled to the antenna structure. The antenna structure includes: a low effective resistance region; and a high effective resistance region having an electrical conductivity less than that of the low effective resistance. The low effective resistance region substantially fully surrounds the high effective resistance region. The high effective resistance region is located such that, if the high effective resistance region had the same conductivity as the low effective resistance region, the high effective resistance region would have a lower current flow than the low effective resistance region. The high effective resistance region is substantially free of conductive material. The low effective resistance region includes conductive ink.

According to yet another aspect of the invention, a method of configuring antenna structures for RFID devices includes altering the design of an antenna structure to reduce cost of the antenna structure by altering the effective resistance of portions of the structure.

According to still another aspect of the invention, an antenna structure for an RFID device includes one or more antenna elements that include a regular shape, with conductive material omitted in one or more portions of the regular.

According to a further aspect of the invention, an antenna structure for an RFID device includes one or more antenna elements that include a regular shape, with a non-uniform effective resistance in the regular shape.

According to a still further aspect of the invention, a method of configuring an antenna structure for an RFID device includes increasing the relative effective resistance of portions of one or more antenna elements that include a regular shape.

According to another aspect of the invention, a radio frequency identification (RFID) device includes: a substrate; an antenna structure on the substrate, wherein the antenna structure with one or more antenna elements that include a regular shape with a low effective resistance region and a high effective resistance region having an electrical conductivity less than that of the low effective resistance; and an RFID strap operatively coupled to the antenna structure.

According to yet another aspect of the invention, a method of configuring a radio frequency identification (RFID) device antenna structure layout includes: selecting an initial antenna structure layout, wherein the initial antenna structure layout includes a conductive element of conductive material, wherein the conductive element has a regular shape; and changing the effective resistance of a portion of the conductive element.

According to still another aspect of the invention, a method of reducing cost of radio frequency identification (RFID) devices, the method includes: selecting an initial antenna structure layout, wherein the initial antenna structure layout includes a conductive element of conductive material; and modifying a portion of the conductive element initial antenna structure layout to produce a modified antenna structure layout having a reduced cost associated therewith.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A radio frequency identification device (RFID) antenna structure includes electrically-conductive material. The antenna structure includes low effective resistance areas and high effective resistance areas. The high effective resistance areas are located in regions where there would be little current flow even if there were less effective resistance, such as the same resistance as the low effective resistance areas. The high effective resistance areas may be spaces within the antenna structure in which there is substantially no electrically conductive material. Alternatively, the high effective resistance areas may have some non-zero electrical conductivity, while still having a higher effective resistance than the low effective resistance areas. Conductive material for the antenna structure may include conductive ink. By reducing or eliminating the amount of conductive material in the high effective resistance areas, and/or by substituting less expensive conductive material, it will be appreciated that reduced-cost devices may be obtained.

Thus by configuring the high effective resistance areas and the low effective resistance areas within the antenna structure, the use of conductive material within the antenna structure may be made more efficient and/or more cost effective. As will be described below, this configuring may include consideration of various suitable variables and combinations of variables. Examples of such variables include the conductive material employed, the thickness and/or shape of the conductive material, and the general layout of the antenna structure. Numerical simulation or other types of simulation may be used to identify portions of an antenna layout where conductive material may be thickened; thinned or removed entirely; where more or less expensive conductive material (of greater or less conductivity, for example) may be employed to best effect; and/or where the surface profile of the conductive material may be varied to decrease or increase effective resistance. Simulations may also be performed on altered configurations to examine the effects of possible alterations, and/or to confirm that performance of the antenna structure will remain within desired parameters.

Figure 1:
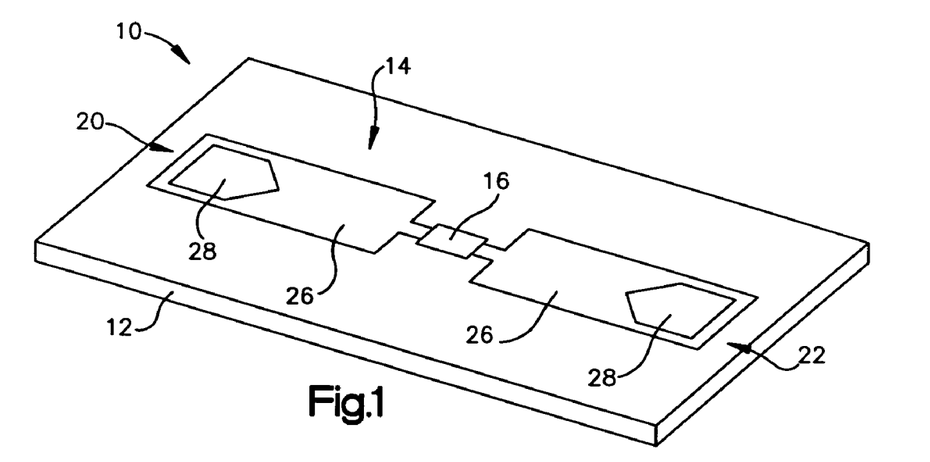
FIG. 1 is an oblique view of a radio frequency identification device (RFID) device in accordance with the present invention.

Referring initially to FIG. 1, a wireless communication or radio frequency identification device (RFID) 10 includes a non-conductive (dielectric) substrate 12, an antenna structure 14, and a strap or chip 16. The antenna structure 14 is illustrated with a pair of separate antenna elements 20 and 22, coupled to the strap or chip 16. However, it will be appreciated that a wide variety of antenna structures, with a different number of antenna elements, and/or with different shapes for the antenna elements, may be suitable for coupling to the strap or chip 16, to allow the strap or chip 16 to engage in wireless communication.

The antenna structure 14 includes low effective resistance portions or areas 26 and high effective resistance portions or areas 28. The low effective resistance portions 26 have a lower effective resistance than the high effective resistance portions 28. The antenna structure 14 is configured such that the high effective resistance portions 28 are sized and located such that, even if they were to have the same effective resistance as the low effective resistance portions 26, the high effective resistance portions 28 would have a lower current flow than the low effective resistance portions. For example, the high effective resistance portions 28 may be configured such that, if they had the same conductivity as the low effective resistance portions 26, they would have less than about 10% of the maximum current flow in other parts of the low effective resistance portions 26.

The phrase "effective resistance" is used here to generally denote resistance provided by an antenna portion resulting to an AC signal. Effective resistance is a function of the conductivity of any conductive material involved, the thickness of the material, and the general distribution of the material (e.g., its cross-sectional shape). The effective resistance thus is not merely a material property of conductive material used in an antenna. Rather, the term embraces a broader range of variations that affect the resistance of an antenna portion.

As will be explained in greater detail below, the difference in effective resistance between the low effective resistance portions 26 and the high effective resistance portions 28 may be accomplished in any of a variety of ways. For example, the low effective resistance portions 26 may be made of a thicker conductive material than the high effective resistance portions 28. In a specific example, the low effective resistance portions 26 may be made of a thicker conductive ink than the high effective resistance portions 28. Alternatively, the low effective resistance portions 26 may have contoured or otherwise uneven surfaces that provide greater surface area than the surface of the high effective resistance portions 28. As another alternative, the low effective resistance portions 26 may have a sandwich structure, with layers of conductive material alternating with layers of non-conductive material, thereby increasing the conductive material surface area of the low effective resistance portions 26.

It will also be appreciated that the current flowing through the antenna structure may be non-uniformly distributed with regard to the depth of the structure. For example, current flow may be concentrated along surfaces of the antenna elements, an effect known as the "skin effect." Thus the amount of surface area, and/or the conductivity of material in the vicinity of the surface, may assume primary importance with regard to effective resistance. The effective resistance of a portion may be largely the function of the thickness of the depth of the antenna portion relative to a "skin depth," a depth through which most of the currently flows.

The high effective resistance portions may be a solid material with effectively zero electrical conductivity. That is, the high effective resistance portions 28 may be substantially insulative.

The high effective resistance portions may be spaces within an antenna structure wherein solid conductive material is omitted or removed from a nominal antenna shape. The nominal shape may be analyzed by computer modeling to decide upon desirable portions of the conductive material to remove or omit. For example, the high effective resistance portions can be areas that are entirely omitted when considering the antenna in plan view; depressions or recesses removed from a nominal antenna shape; regions of reduced thickness; material removed from angular edges of the nominal shape to form a curved contour; etc.

The nominal shape may be a regular antenna shape, wherein removal of portions of this shape results in an irregular shape. A regular shape, as the phrase is used herein, refers to traditional antenna shapes utilized for coupling to an RFID chip or strap, to facilitate communication between the chip and a receiver or detector, for example. Regular shapes may include polygonal shapes, such as rectangular or triangular antenna elements. Regular shape elements also include various types or loop antennas. Also included in regular shape antenna elements are adaptive antenna elements, such as those described in U.S. Provisional Application No. 60/517,148, filed Nov. 4, 2003, which is incorporated herein by reference in its entirety.

The low effective resistance portions 26 may fully surround the high effective resistance portions 28. The low effective resistance portions 26 thus may include portions fully around the border of the antenna structure 14. By having the low effective resistance portions 26 fully around the high effective resistance portions 28, the antenna structure 14 may have better impedance performance, compared with a configuration in which the high effective resistance portions 28 are not fully surrounded by the low effective resistance portions 26.

The configuration of the high effective resistance portions 28 may be determined by computer modeling or other modeling methods, as will be discussed further below. A numerical simulation of a proposed shape for the antenna structure 14 may be run, to determine expected current flows within the proposed antenna shape. The areas and/or volumes where low current flow is expected may be suitable candidates for the high effective resistance portions 28, areas for which low effective resistance material may be replaced with high effective resistance material, or for which conductive material may be omitted entirely. A numerical simulation may then be performed on the revised design for the antenna structure 14, with the low effective resistance portions 26 and the high effective resistance portions 28, to determine the degree to which performance of the antenna structure 14 is adversely affected by the introduction of the high effective resistance portions 28. It will be appreciated that some degree of performance reduction may be acceptable in exchange for the reduction of cost due to replacement of low effective resistance areas with the high effective resistance portions 28. Nonetheless, it will be appreciated that the change in performance due to the introduction of the high effective resistance portions 28 may be minor, since the high effective resistance portions 28 may be confined to portions of the antenna structure 14 which would have low current flow, even if the high effective resistance portions 28 were transformed into low effective resistance portions.

The numerical simulation described above may be accomplished with any of a variety of suitable software packages. One example of a suitable software package is ANSOFT High Frequency Structure Simulator, which enables a three-dimensional simulation to be performed.

There may be a threshold level of current flow for candidates for the high effective resistance portions 28. For example, candidates for the high effective resistance portions 28 may be drawn from those regions of the antenna structure 14 that would have current less than about 10% of the maximum current flow level in the antenna structure 14. It will be appreciated that this threshold value for consideration as a high effective resistance portion is only an example, and that other threshold values of current flow may be utilized.

The antenna structure 14 may have one or more elements that include a regular shape, with conductive material added and/or removed to produce non-uniformity of effective resistance within the regular shape.

In traditional antennas, antenna elements having regular shapes have generally had uniform effective resistance throughout. In accord with the above discussion, an antenna structure having one or more elements with regular shapes may have a non-uniform effective resistance, with some areas or portions having a lower effective resistance than other areas or portions. A method of configuring the RFID device 10 may involve modifying an antenna structure having one or more elements with regular shapes, to increase or decrease resistance of some portions of the regular-shape antenna element(s).

The non-conductive substrate 12 may include any of a variety of suitable materials, such as a suitable polymeric material. Examples of suitable such materials include, but are not limited to, high Tg polycarbonate, poly(ethylene terephthalate), polyarylate, polysulfone, a norbornene copolymer, poly phenylsulfone, polyetherimide, polyethylenenaphthalate (PEN), polyethersulfone (PES), polycarbonate (PC), a phenolic resin, polyester, polyimide, polyetherester, polyetheramide, cellulose acetate, aliphatic polyurethanes, polyacrylonitrile, polytrifluoroethylenes, polyvinylidene fluorides, HDPEs, poly(methyl methacrylates), a cyclic or acyclic polyolefin, or paper.

Conductive material used in the low effective resistance portions 26, and possibly in the high effective resistance portions 28, may include suitable conductive materials, such as suitable conductive inks. Such conductive inks may include inks with suitable conductive materials such as conductive metal or non-metal particles. Examples of suitable conductive materials include copper particles, nickel particles, silver particles, aluminum particles, various metal alloy particles, carbon particles, and conductive polymer particles. Examples of conductive polymers include intrinsically conductive polymers such as polyethylenedioxythiophene (PEDOT), polypyrrole (PPy), or polyaniline (PANI).

Conductive inks may be selectively deposited to form the antenna structure 14 by any of a variety of suitable processes, such as flexo printing, offset printing, and gravure printing. The resistance may be less than 100 ohms per square. (Resistivity is measured on a strip with a 10:1 length to width ratio. Ohm/square is determined by dividing the resistance measurement along the length by 10.) Of course, it will be appreciated that the choice of material may depend on such factors as cost and availability of conductive materials, and the level of conductivity required.

The antenna structure 14 may also include conductive materials deposited in other ways, such as by electroplating, physical deposition, or chemical deposition. For example, a layer of copper may be deposited by such methods. Selective removal processes such as etching may be used to remove suitable portions of the deposited conductive material.

The RFID strap 16 may be any of a variety of combinations of wireless communication devices (RFID chips) with conductive leads coupled thereto to facilitate electrical connection. Examples of suitable RFID straps include an RFID strap available from Alien Technologies, and the strap marketed under the name I-CONNECT, available from Philips Electronics. Chips available from Alien Technologies may be attached either conductively, in a flip-chip die, or conductively or reactively for a strap form of the chip. Suitable RFID chips include the Philips HSL chip, available from Philips Electronics, and the EM Marin EM4222, available from EM Microelectronic-Marin SA, as well as RFID chips available from Matrics Inc. of Columbia, Md. USA.

The RFID strap or chip 16 may be coupled to the antenna structure 14 by any of a variety of suitable methods, such as, for example, by use of a conductive adhesive, by use of welding and/or soldering, or by electroplating.

It will be appreciated that the RFID device 10 may have other layers and/or structures. For example, the RFID device 10 may have an adhesive layer for use in adhering the RFID device 10 to an object. The adhesive layer may have a peel layer thereupon for protecting the adhesive prior to use. The RFID device 10 may also have other layers, such as protective layers, and/or a printable layer for printing information thereupon. It will be appreciated that the RFID device 10 may also include additional suitable layers and/or structures, other than those mentioned herein.

Figure 2:
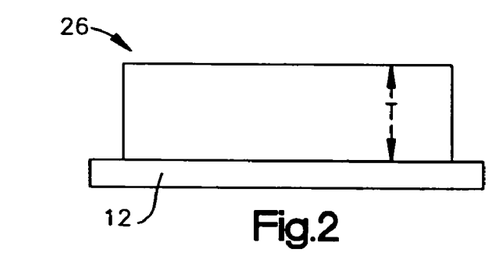
FIG. 2 is a cross-sectional view of a first embodiment of the configuration of a low effective resistance region of the RFID device of FIG. 1.
Figure 3:
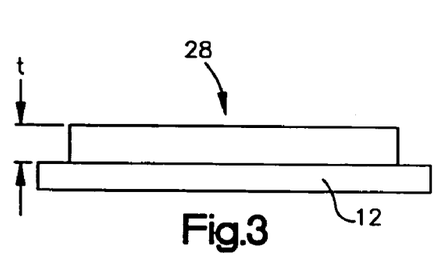
FIG. 3 is a cross-sectional view of an embodiment of the configuration of a high effective resistance region of the RFID device of FIG. 1.

Turning now to FIGS. 2 and 3, potential configurations for the low effective resistance portion 26 (FIG. 2) and the high effective resistance portion 28 (FIG. 3) are shown. As shown, the low effective resistance portion 26 has a thickness T that is greater than a thickness t of the high effective resistance portion 28. It will be appreciated that a thicker region of conductive material, such as conductive ink, has a higher electrical conductivity than a thinner region. However, there is less need for conductivity in the high effective resistance portion 28, due to the low electrical current flow expected there. Therefore a reduced thickness of the conductive material may be employed in the high effective resistance portion 28.

By reducing the amount of the conductive material in the high effective resistance portion 28, it will be appreciated that a cost savings may be achieved for the antenna structure 14. As stated above, conductive material may be omitted entirely in the high effective resistance portion 28, equivalent to the thickness t being reduced to zero. This omission of conductive material entirely for the high effective resistance portion 28 may still allow for reasonable performance of the antenna structure 14, due to the placement of the high effective resistance portions 28 at locations where there would be low current flow in any event.

The different thicknesses may be produced by multiple printing operations, with for example additional layers of conductive ink being printed for the thicker portions. Multiple printing operations may be performed by means of flexo printing or screen printing. A first printing operation may be used to print a layer of conductive ink on both thin and thick portions of the antenna structure 14. A second printing operation may be used to print an additional layer of conductive ink, only on the thicker portions of the antenna structure 14.

It will be appreciated that the multiple printing operations may have a variety of suitable characteristics. The multiple printing operations may involve the same conductive ink, or may alternatively involve different types of conductive ink. The multiple printing operations may each involve deposition of the same thickness of ink. Alternatively the thicknesses for the two printing operations may be different. Further, there may be more than two printing operations used.

Figure 4:
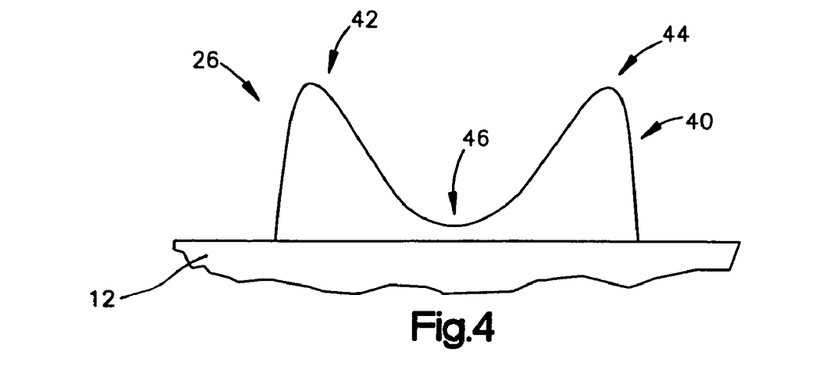
FIG. 4 is a cross-sectional view of a second embodiment of the configuration of a low effective resistance region of the RFID device of FIG. 1.

FIG. 4 shows another configuration of the low effective resistance portion 26, the portion 26 having a contoured surface 40. By having a non-flat or contoured surface 40, the low effective resistance portion 26 shown in FIG. 4 has a greater surface area than a portion with a flat surface. Since current may preferentially flow in the region near the edges of the low effective resistance portion 26, increasing the thickness of the low effective resistance portion 26 near its edges may increase the effective conductivity of the low effective resistance portion 26.

The contoured surface 40 may be a curved surface, such as is illustrated in FIG. 4. The contoured surface 40 shown in FIG. 4 (which is greatly exaggerated for illustration purposes) has thickened parts 42 and 44 near the edges of the low effective resistance portion 26, and a thinner middle portion 46. The thickened parts 42 and 44 near the edges of the low effective resistance portion 26 allow for easier current flow through parts near the edges.

It will be appreciated that the contoured surface 40, with variable thickness for different parts of the low effective resistance portion 26, may take any of a variety of configurations. Thickened parts of the low effective resistance portion 26 may be located at the edges or at other locations within the low effective resistance portion 26 where large current flows are expected. The low effective resistance portion 26 may have uneven thickness in any of a variety of suitable configurations, with any of a variety of suitable surface shapes. The surfaces may be curved or have other suitable shapes.

The uneven-thickness portions may have variations in thickness from about 5% to as much as 100% (full removal of conductive material), although it will be appreciated that other suitable variations in thickness may be utilized. The variations in thickness may be achieved by suitable printing processes. Multiple printing steps, such as described above, may be used to print the uneven-thickness low effective resistance portion 26.

It will be appreciated that good performance may be achieved with reduced use of conductive material, by making the low effective resistance portion 26 have an uneven thickness, with additional conductive material concentrated where relatively large current flows are expected. To some degree, the use of variable thickness within the low effective resistance portion is an extension of the concept described above with regard to FIGS. 2 and 3, that of having the low effective resistance portion 26 be thicker than the high effective resistance portion 28. Computer modeling or other numerical simulations may be utilized to determine where to place the thicker parts of the low effective resistance portion 26, in order to make best use of the additional conductive material.

Figure 5:
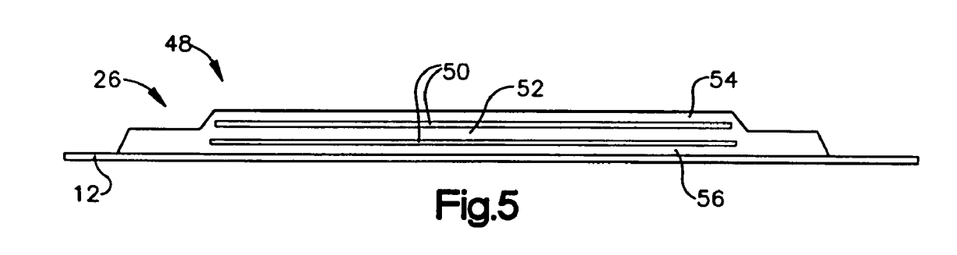
FIG. 5 is a cross-sectional view of a third embodiment of the configuration of a low effective resistance region of the RFID device of FIG. 1.

FIG. 5 illustrates another configuration for the low effective resistance portion 26, with the low effective resistance portion 26 having a stacked structure 48 that includes multiple conductive layers 50 atop one another, separated by an insulator layer 52. The multiple conductive layers 50 may be coupled to one another on their ends, and may be coupled to one another at multiple locations. Further insulator layers 54 and 56 may be provided on the top and the bottom of the stacked structure 48. By separating the individual conductive layers 50 by placement of the insulator layer 52 in between, the conductive layers 50 have more surface area, and may therefore have reduced RF resistance.

It will be appreciated that the stacked structure 48 may have a greater number of layers than shown, with for example additional conductive layers 50 partially separated from other of the conductive layers 50 by additional insulator layers 52.

Figure 6:
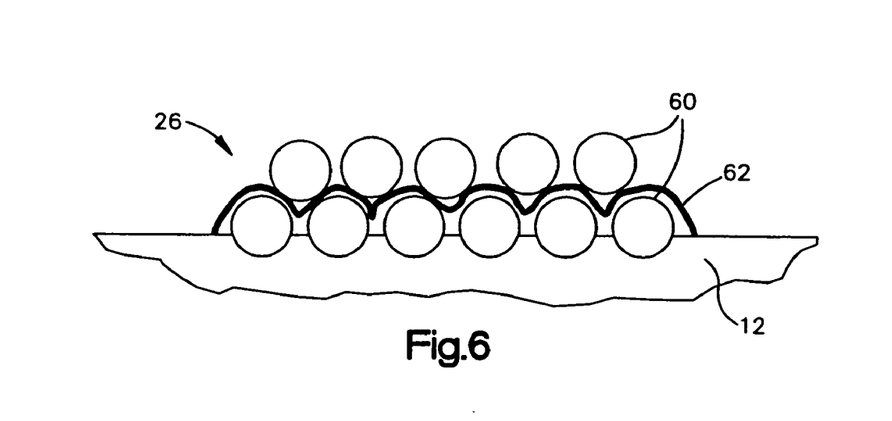
FIG. 6 is a cross-sectional view of a fourth embodiment of the configuration of a low effective resistance region of the RFID device of FIG. 1.

FIG. 6 shows yet another configuration for the low effective resistance portion 26, which has an array of discrete conductors 60, layers of which may be separated by an insulator layer 62. The conductors 60 are illustrated as having generally circular cross-section shapes. The shapes of the cross-sections of the conductors 60 may be determined to some extent by an uneven surface 66 of a portion of the non-conductive substrate 12. The uneven surface 66 may have a series of depressions 70 that preferentially receive conductive material, such as conductive ink, printed or deposited thereupon. Surface tension forces in the deposited conductive ink may form the conductors 60 shown.

The insulator layer 62 may be printed or otherwise deposited on a bottom layer of the conductors, providing an uneven surface for printing or deposition of further of the conductors 60. Thus multiple layers of the conductors 60 may be deposited or otherwise formed.

The conductors 60 may be electrically coupled together at their ends or at other points along their lengths. By splitting the conductive material in the multiple discrete conductors 60, the surface area of the conductors 60 is increased, which may result in reduced RF resistance. Thus lower conductor costs and/or lower resistive losses may be obtained.

Figure 7:
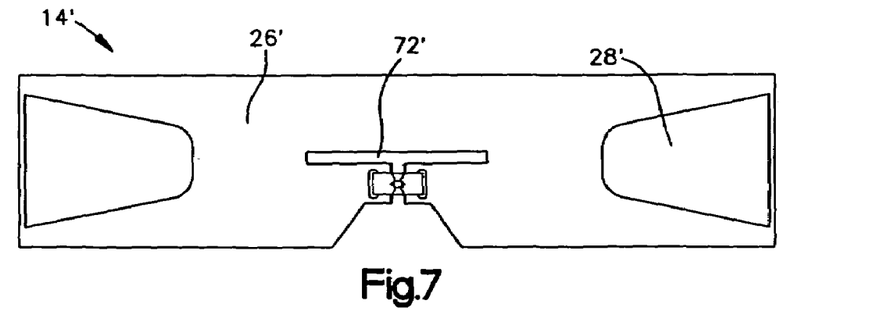
FIGS. 7 and 8 are plan view of specific antenna layouts in accordance with the present invention.
Figure 8:
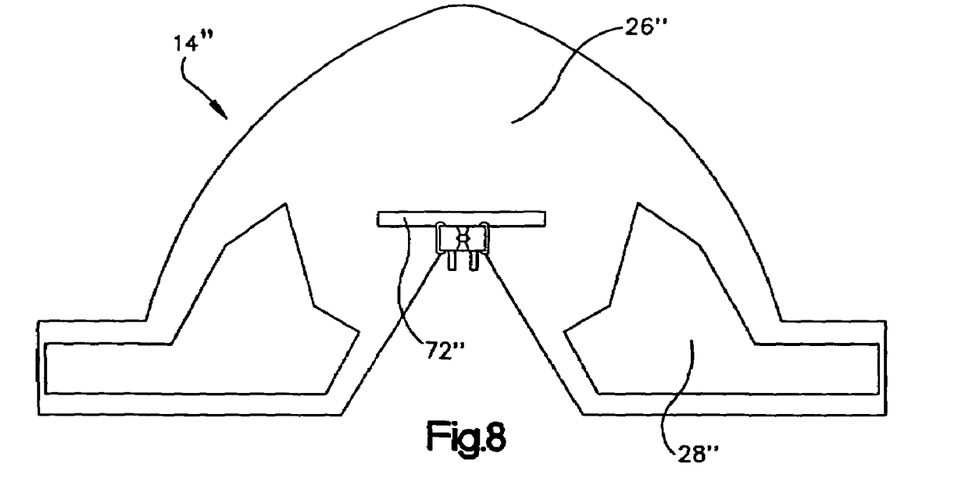

Turning now to FIGS. 7 and 8, a pair of antenna structures 14' and 14" are shown as parts of RFID device, such as the RFID device 10 (FIG. 1). The structures 14' and 14" have respective resonant slots 72' and 72", next to which a strap or chip 16 is coupled. High effective resistance areas 28' and 28" of the antenna structures 14' and 14" are surrounded by the low effective resistance areas 26' and 26".

The high effective resistance areas 28' and 28" make up a significant percentage of the antenna structures 14' and 14". By omitting or reducing the amount of conductive material utilized in the high effective resistance areas 28' and 28", it will be appreciated that significant savings may be achieved, both in the amount of conductive material utilized and the cost of the resulting RFID devices 10' and 10".

Figure 9:
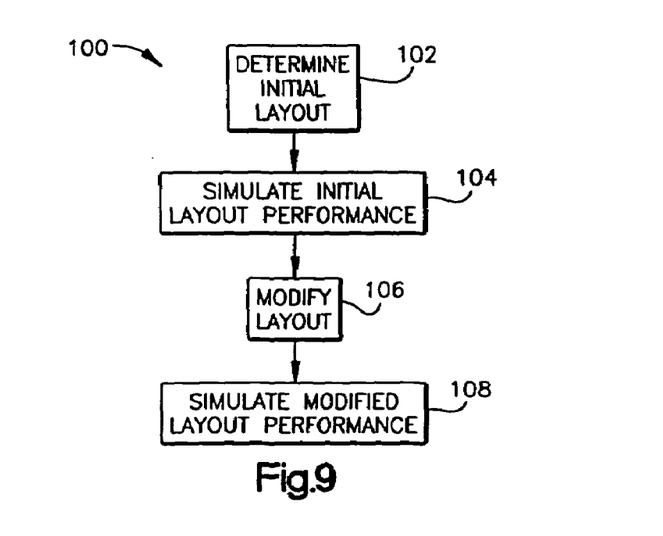
FIG. 9 is a high level flow chart of a method, in accordance with the present invention, for configuring an antenna structure.

FIG. 9 illustrates a high-level flow chart for a method 100 of configuring an antenna structure, as described above, with high and low effective resistance regions. In step 102 of the method 100, an initial layout of the antenna structure 14 (FIG. 1) is determined, with the entire antenna structure configured as low effective resistance material. The step 102 may include selecting an initial layout where as one or more antenna elements having regular shapes. The initial layout may be made based on any of a number of factors, such as: space available on the RFID device 10 (FIG. 1); characteristics of the strap or chip 16 (FIG. 1) that the antenna structure 14 is to be coupled to; and intended use environment for the RFID device 10 (frequency and signal strength the RFID device 10 is to be exposed to).

In step 104 the performance of the initial layout is simulated. Performance may be simulated by computer modeling, or by other suitable methods.

The layout is then modified in step 106, to increase or decrease effective resistance in selected areas. As discussed above, a threshold current flow level from the simulation may be used to identify portions of the initial layout that would be candidates for replacement of low effective resistance material with high effective resistance material. It will be appreciated that a wide variety of other modifications, based on a variety of other factors, may be considered. The cost of materials may be factored in, with suitable trade-offs being made between cost of material, conductivity of material, and amount (volume) of conductive material used. The modifying in step 106 may include, for instance, identifying portions of the antenna structure 14 wherein less expensive, less conductive material may be substituted for more expensive, more conductive material. It will be appreciated that data regarding cost and conductivity of suitable materials may be obtained and suitably used in the modifying process.

Alternatively or in addition, the modifying may involve reconfiguring the antenna structure to make optimum use of conductive material, for example by suggesting where conductive material may be thickened and/or thinned so as to achieve best performance with a given amount (volume) of conductive material, or to minimize the amount of conductive material utilized for a given performance. It will be appreciated that a wide variety of suitable factors may be considered in the modifying process, with a wide variety of suitable constraints available to control or direct the modification process.

Finally, in step 108, the modified layout, with the high effective resistance portions 28, may be checked by simulating its performance. The simulation may be performed in the same manner that the performance of the initial layout was simulated in step 104. Characteristics of the simulated performances of the initial layout and the modified antenna structure (with the high effective resistance portions 26) may then be compared with one another to determine the impact on performance of replacing low effective resistance material with the high effective resistance portions 28. Measures of antenna structure performance, such as overall gain of the antenna structure, may be compared as part of the process in step 108.

It will be appreciated that additional steps may be performed as part of a method of configuring the antenna structure 14. For example, the configuration of the antenna structure 14 may be an iterative process, with additional simulations suggesting additional portions that may be converted from low effective resistance material to high effective resistance material, or vice versa. The configuring may also involve selecting characteristics and/or configurations for the low effective resistance and/or high effective resistance portions, among the various types of configurations described herein.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of configuring a radio frequency identification (RFID) device antenna structure, the method comprising:
   identifying a low-current-flow portion of an antenna layout proposed for the antenna structure; and
   placing a high effective resistance region in the low-current-flow portion, and low effective resistance regions in other portions of the antenna layout.

2. The method of claim 1, wherein the identifying includes numerically simulating performance of the antenna layout.

3. The method of claim 2, wherein the numerically simulating includes simulating performance under the assumption of the antenna layout having substantially uniform conductivity.

4. The method of claim 2, wherein the identifying includes identifying the low-current-flow portion as a portion having a current flow below a threshold current value.

5. The method of claim 4, wherein the threshold current is a predetermined percentage of a maximum current flow determined in the numerically simulating.

6. The method of claim 1, wherein the placing includes placing the low effective resistance regions so as to substantially fully surround the high effective resistance region.

7. The method of claim 1, wherein the low effective resistance regions are thicker than the high effective resistance region.

8. The method of claim 1, wherein the low effective resistance regions have an uneven thickness.

9. The method of claim 1, wherein the low effective resistance regions have a stacked structure, with a pair of conductive layers separated in part from one another by an intervening insulator layer.

10. The method of claim 9, wherein the conductive layers each include multiple discrete conductors.

11. The method of claim 10, wherein the discrete conductors each have a substantially circular cross section.

12. The method of claim 2, further comprising numerically simulating performance of a modified antenna layout having the low effective resistance and high effective resistance regions.

13. The method of claim 12, further comprising comparing the simulated performances of the antenna layouts with one another, to thereby examining the effect of introducing the high effective resistance regions.

14. The method of claim 1, wherein the high effective resistance regions are substantially free of conductive material.

15. A radio frequency identification (RFID) device comprising:
   a substrate;
   an antenna structure on the substrate, wherein the antenna structure includes:
      a low effective resistance region; and
      a high effective resistance region having an electrical conductivity less than that of the low effective resistance;
      wherein the low effective resistance region substantially fully surrounds the high effective resistance region; and
   an RFID strap operatively coupled to the antenna structure.

16. The device of claim 15, wherein the high effective resistance region is located such that, if the high effective resistance region had the same conductivity as the low effective resistance region, the high effective resistance region would have a lower current flow than the low effective resistance region.

17. The device of claim 15, wherein the high effective resistance region includes at least about 10% of the antenna layout.

18. The device of claim 15, wherein the high effective resistance region is substantially free of conductive material.

19. The device of claim 15, wherein the low effective resistance region is thicker than the high effective resistance region.

20. The device of claim 15, wherein the low effective resistance region has an uneven thickness.

21. The device of claim 15, wherein the low effective resistance region has a stacked structure, with a pair of conductive layers separated in part from one another by an intervening insulator layer.

22. The device of claim 21, wherein the conductive layers each include multiple discrete conductors.

23. The device of claim 22, wherein the discrete conductors each have a substantially circular cross section.

24. The device of claim 15, wherein the low effective resistance region includes conductive ink.

25. The device of claim 15, wherein the low effective resistance region includes plated conductive material.

26. A radio frequency identification (RFID) device comprising:
a substrate;
an antenna structure on the substrate, wherein the antenna structure with one or more antenna elements has a regular shape, where the antenna structure includes:
a low effective resistance region; and
a high effective resistance region having an electrical conductivity less than that of the low effective resistance; and
an RFID strap operatively coupled to the antenna structure.

27. The device of claim 26, wherein the regular shape is a polygonal shape.

28. The device of claim 26, wherein the regular shape is a rectangular shape.

29. The device of claim 26, wherein the high effective resistance region is located such that, if the high effective resistance region had the same conductivity as the low effective resistance region, the high effective resistance region would have a lower current flow than the low effective resistance region.

30. The device of claim 26, wherein the high effective resistance region includes at least about 10% of the antenna layout.

31. The device of claim 26, wherein the high effective resistance region is substantially free of conductive material.

32. The device of claim 26, wherein the low effective resistance region is thicker than the high effective resistance region.

33. The device of claim 26, wherein the low effective resistance region has an uneven thickness.

34. The device of claim 26, wherein the low effective resistance region has a stacked structure, with a pair of conductive layers separated in part from one another by an intervening insulator layer.

35. The device of claim 34, wherein the conductive layers each include multiple discrete conductors.

36. The device of claim 35, wherein the discrete conductors each have a substantially circular cross section.

37. The device of claim 26, wherein the low effective resistance region includes conductive ink.

38. The device of claim 26, wherein the low effective resistance region includes plated conductive material.

39. A method of configuring a radio frequency identification (RFID) device antenna structure layout, the method comprising:
selecting an initial antenna structure layout, wherein the initial antenna structure layout includes a conductive element of conductive material, wherein the conductive element has a regular shape; and
changing the effective resistance of a portion of the conductive element.

40. The method of claim 39, wherein changing includes removing substantially all of the conductive material from the portion.

41. The method of claim 39, wherein the changing includes thinning the conductive material in the portion.

42. The method of claim 39, wherein the changing includes configuring the conductive element to have a low effective resistance portion and a high effective resistance portion.

43. The method of claim 39,
wherein the portion is a portion of the initial antenna structure layout where low current flow is expected, relative to other parts of the conductive element; and
wherein the changing includes increasing effective resistance in the portion.

44. The method of claim 43, wherein the portion is substantially fully surrounded by other portions of the conductive element.

45. A method of reducing cost of radio frequency identification (RFID) devices, the method comprising:
selecting an initial antenna structure layout, wherein the initial antenna structure layout includes a conductive element of conductive material; and
modifying a portion of the conductive element of the initial antenna structure layout to produce a modified antenna structure layout having a reduced cost associated therewith.

46. The method of claim 45, wherein the conductive element selected has a regular shape.

47. The method of claim 45, wherein the portion is substantially surrounded by other parts of the conductive element.

48. The method of claim 45, wherein the modifying includes removing substantially all of the conductive material from the portion.

49. The method of claim 45, wherein the modifying includes thinning the conductive material of the portion.

50. The method of claim 45, wherein the modifying includes changing the conductive material of the portion.

51. The method of claim 45, wherein the modifying includes changing the effective resistance of the portion.

52. The method of claim 45,
further comprising, prior to the modifying, simulating performance of the initial antenna structure layout;
wherein the modifying includes selecting the portion based on results of the simulating.

53. The method of claim 52, wherein the selecting includes selecting based on current flow in the initial antenna structure layout predicted by the simulating.

* * * * *